United States Patent
Waugh et al.

(10) Patent No.: US 10,853,359 B1
(45) Date of Patent: Dec. 1, 2020

(54) DATA LOG STREAM PROCESSING USING PROBABILISTIC DATA STRUCTURES

(71) Applicant: Amazon Technologies, Inc., Seattle, WA (US)

(72) Inventors: Robert Mark Waugh, Seattle, WA (US); Greg Sterin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 739 days.

(21) Appl. No.: 14/977,497

(22) Filed: Dec. 21, 2015

(51) Int. Cl.
*G06F 16/24* (2019.01)
*G06F 16/245* (2019.01)
*G06F 16/951* (2019.01)
*G06F 16/18* (2019.01)

(52) U.S. Cl.
CPC ........ *G06F 16/245* (2019.01); *G06F 16/1805* (2019.01); *G06F 16/951* (2019.01)

(58) Field of Classification Search
CPC ................................................. G06F 17/30424
USPC ......................................................... 707/609
See application file for complete search history.

(56) References Cited

U.S. PATENT DOCUMENTS

| | | | |
|---|---|---|---|
| 5,659,731 A | 8/1997 | Gustafson | |
| 6,141,694 A | 10/2000 | Gardner | |
| 6,366,744 B1 | 4/2002 | Phillips et al. | |
| 8,468,134 B1 * | 6/2013 | McHugh | G06F 16/24556 707/638 |
| 8,572,091 B1 * | 10/2013 | Sivasubramanian | G06F 16/278 707/747 |
| 8,812,651 B1 * | 8/2014 | Eriksen | H04L 45/745 709/224 |
| 8,832,832 B1 | 9/2014 | Visbal | |
| 8,892,672 B1 | 11/2014 | Rackliffe | |
| 8,972,400 B1 | 3/2015 | Kapczynski et al. | |
| 9,218,468 B1 | 12/2015 | Rappaport | |
| 9,319,379 B1 | 4/2016 | Burcham et al. | |
| 9,514,199 B1 * | 12/2016 | Deprey | G06F 16/248 |
| 9,785,696 B1 | 10/2017 | Yakhnenko et al. | |
| 9,860,317 B1 | 1/2018 | Gupta | |
| 9,887,992 B1 | 2/2018 | Venkat et al. | |
| 10,067,986 B1 | 9/2018 | Thapliyal et al. | |
| 2002/0035570 A1 | 3/2002 | Kozam et al. | |
| 2003/0097349 A1 | 5/2003 | Kabasakalian et al. | |

(Continued)

OTHER PUBLICATIONS

Sterin, G., "Partitioned Search of Log Events," U.S. Appl. No. 14/843,850, filed Sep. 2, 2015.

*Primary Examiner* — Pierre M Vital
*Assistant Examiner* — Andrew N Ho
(74) *Attorney, Agent, or Firm* — Davis Wright Tremaine LLP

(57) ABSTRACT

A computing resource monitoring service receives a request to obtain data for various computing resources. The service obtains, from the various computing resources, one or more data log streams that include the requested data. The service utilizes the one or more data log streams to generate a probabilistic data structure that can be used to indicate that data log streams have been processed. If the one or more data log streams are not completely processed prior to the end of an allotted time period for processing of the request, the service generates a token that specifies partially processed data log streams and the probabilistic data structure. The token can be used to enable resumption of processing of the request.

20 Claims, 8 Drawing Sheets

(56) References Cited

U.S. PATENT DOCUMENTS

| | | |
|---|---|---|
| 2003/0130894 A1 | 7/2003 | Huettner et al. |
| 2003/0154138 A1 | 8/2003 | Phillips et al. |
| 2004/0083216 A1 | 4/2004 | Kozam et al. |
| 2004/0120013 A1 | 6/2004 | Elkady et al. |
| 2005/0120004 A1* | 6/2005 | Stata ................... G06F 16/31 707/999.003 |
| 2005/0198076 A1* | 9/2005 | Stata ............... G06F 17/30672 |
| 2006/0106774 A1 | 5/2006 | Cohen et al. |
| 2006/0161435 A1 | 7/2006 | Atef et al. |
| 2006/0193008 A1 | 8/2006 | Osaka et al. |
| 2007/0147659 A1 | 6/2007 | Eremita et al. |
| 2007/0168336 A1 | 7/2007 | Ransil et al. |
| 2007/0192106 A1 | 8/2007 | Zilca |
| 2007/0260575 A1 | 11/2007 | Robinson et al. |
| 2008/0028293 A1 | 1/2008 | Seliutin et al. |
| 2008/0040162 A1 | 2/2008 | Brice |
| 2008/0059447 A1 | 3/2008 | Winner et al. |
| 2008/0086755 A1* | 4/2008 | Darnell ............. H04N 5/44543 725/105 |
| 2008/0086759 A1 | 4/2008 | Colson |
| 2008/0147812 A1 | 6/2008 | Curtis |
| 2008/0256517 A1 | 10/2008 | Atkin et al. |
| 2008/0278579 A1 | 11/2008 | Donovan et al. |
| 2008/0288277 A1 | 11/2008 | Fasciano |
| 2008/0319983 A1 | 12/2008 | Meadows |
| 2009/0254499 A1 | 10/2009 | Deyo |
| 2010/0228701 A1* | 9/2010 | Harris, III ............... H04L 51/12 707/683 |
| 2010/0250727 A1 | 9/2010 | King et al. |
| 2011/0022416 A1 | 1/2011 | Bergquist et al. |
| 2011/0035390 A1 | 2/2011 | Whitehouse |
| 2011/0054933 A1 | 3/2011 | Johnson et al. |
| 2011/0142234 A1 | 6/2011 | Rogers |
| 2011/0185282 A1 | 7/2011 | Mahmood et al. |
| 2011/0225140 A1 | 9/2011 | Wu |
| 2011/0246484 A1 | 10/2011 | Dumais et al. |
| 2011/0270748 A1 | 11/2011 | Graham, III et al. |
| 2012/0130723 A1 | 5/2012 | Bhattacharjee |
| 2012/0136853 A1 | 5/2012 | Kennedy et al. |
| 2012/0197928 A1 | 8/2012 | Zhang et al. |
| 2012/0197934 A1 | 8/2012 | Zhang et al. |
| 2012/0310701 A1 | 12/2012 | Llopis et al. |
| 2012/0311684 A1 | 12/2012 | Paulsen et al. |
| 2013/0091581 A1 | 4/2013 | Pirani |
| 2013/0097123 A1 | 4/2013 | McColgan et al. |
| 2013/0166374 A1 | 6/2013 | Capuozzo et al. |
| 2013/0204652 A1 | 8/2013 | Marins et al. |
| 2013/0275230 A1 | 10/2013 | Sawyer et al. |
| 2013/0301937 A1 | 11/2013 | Alasaarela et al. |
| 2013/0318049 A1 | 11/2013 | Shepard et al. |
| 2013/0346497 A1 | 12/2013 | Hofmayer et al. |
| 2014/0025297 A1 | 1/2014 | Josefiak et al. |
| 2014/0081932 A1 | 3/2014 | Krislov |
| 2014/0129464 A1 | 5/2014 | Grayevsky |
| 2014/0172681 A1 | 6/2014 | Lamp et al. |
| 2014/0214745 A1 | 7/2014 | Walsh |
| 2014/0237496 A1 | 8/2014 | Julian |
| 2014/0257924 A1 | 9/2014 | Xie et al. |
| 2014/0258243 A1 | 9/2014 | Bell |
| 2014/0270329 A1 | 9/2014 | Rowley et al. |
| 2015/0006492 A1 | 1/2015 | Wexler et al. |
| 2015/0073875 A1 | 3/2015 | Rahman et al. |
| 2015/0112880 A1 | 4/2015 | Blaylock, IV et al. |
| 2015/0220619 A1 | 8/2015 | Gray et al. |
| 2015/0235238 A1 | 8/2015 | Babinowich et al. |
| 2015/0278290 A1 | 10/2015 | Work et al. |
| 2015/0293725 A1 | 10/2015 | Yoshihara |
| 2016/0004769 A1* | 1/2016 | Gukal ................. G06F 16/3331 707/730 |
| 2016/0048549 A1 | 2/2016 | Patterson et al. |
| 2016/0063440 A1 | 3/2016 | Webb |
| 2016/0078095 A1 | 3/2016 | Man et al. |
| 2016/0078134 A1 | 3/2016 | Zhou et al. |
| 2016/0103881 A1* | 4/2016 | Gukal ................... G06F 16/248 707/722 |
| 2016/0217209 A1 | 7/2016 | Beamon et al. |
| 2016/0364427 A1 | 12/2016 | Wedgeworth, III |
| 2017/0004573 A1 | 1/2017 | Hussain |
| 2017/0024662 A1 | 1/2017 | Warn et al. |
| 2017/0054601 A1 | 2/2017 | Affoneh et al. |
| 2017/0060933 A1 | 3/2017 | Feldman |
| 2017/0171346 A1 | 6/2017 | Shuster |
| 2017/0236060 A1 | 8/2017 | Ignatyev |
| 2018/0018429 A1 | 1/2018 | Rice |
| 2018/0054406 A1 | 2/2018 | Albouyeh et al. |

\* cited by examiner

DATA LOG STREAM PROCESSING USING PROBABILISTIC DATA STRUCTURES

CROSS REFERENCE TO RELATED APPLICATION

This application incorporates by reference for all purposes the full disclosure of co-pending U.S. patent application Ser. No. 14/843,850, filed Sep. 2, 2015, entitled "PARTITIONED SEARCH OF LOG EVENTS."

BACKGROUND

Customers and administrators of a computing resource service provider, as well as other users of computing resources of the computing resource service provider often utilize monitoring services to measure, diagnose, and improve how they operate their computing resources. For instance, through these monitoring services, customers, administrators, and other user can obtain data for their computing resources and use this data to determine whether their computing resources are functioning properly. If their computing resources are not functioning properly, the data can be used to identify and enable customers, administrators, and other users to troubleshoot any issues that may be present. These monitoring services may rely on data log streams from a variety of different computing resources to obtain and generate the data necessary for the customers, administrators, and other users to perform evaluation of their respective computing resources. However, as newly active data log streams are introduced, it can be difficult for these monitoring services to identify which data log streams are to be considered or which data log streams have been processed or not.

BRIEF DESCRIPTION OF THE DRAWINGS

Various techniques will be described with reference to the drawings, in which.

DETAILED DESCRIPTION

Figure 1:
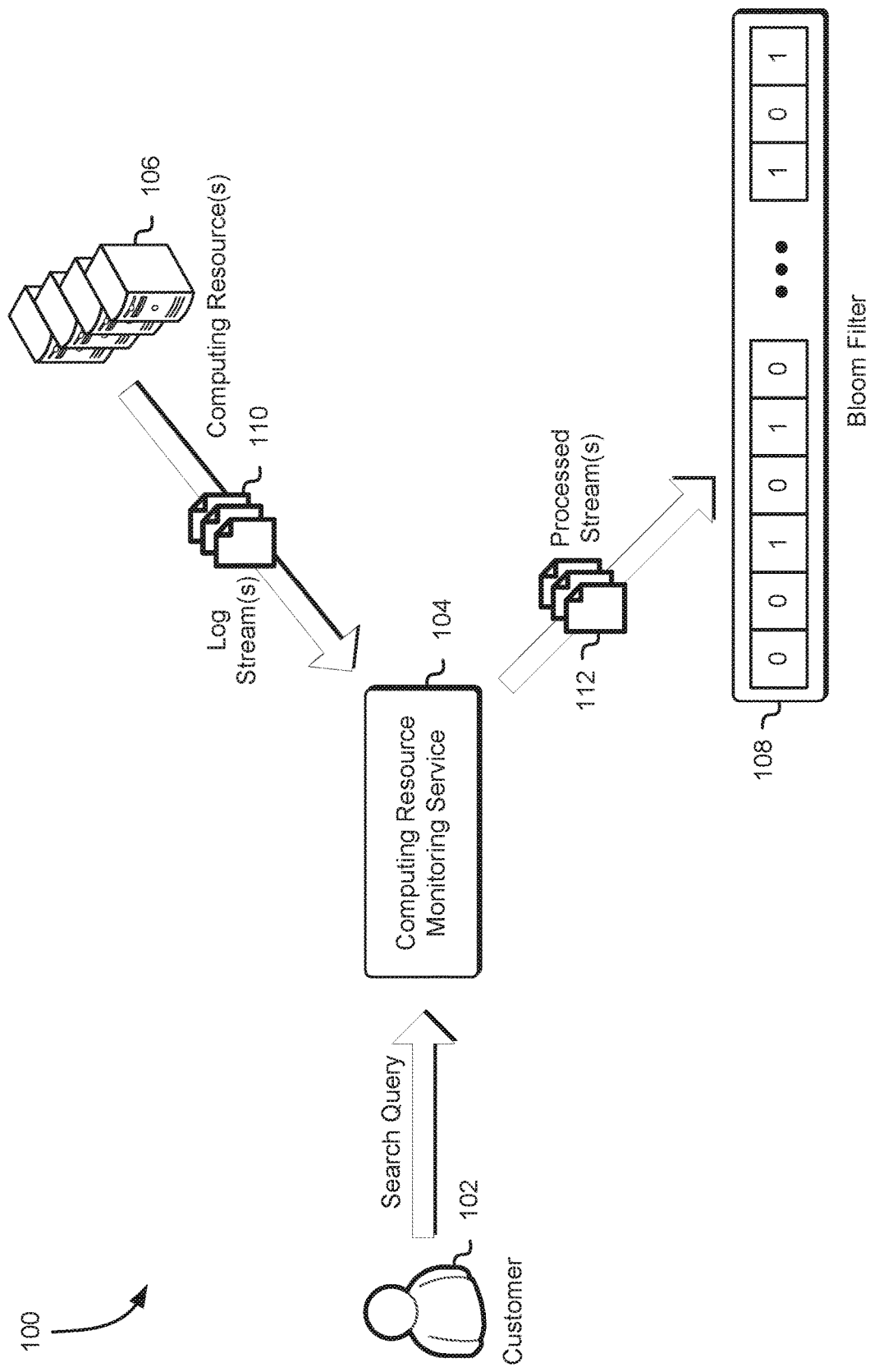
FIG. 1 shows an illustrative example of an environment in which various embodiments can be implemented.

This disclosure relates to the encoding and use of probabilistic data structures, such as Bloom filters, to keep track of data log streams that have been fully processed by a computing resource monitoring service in response to a customer query for data associated with its computing resources. In some examples, a customer of a computing resource service provider transmits a request to a computing resource monitoring service to obtain data for one or more of its computing resources maintained by the computing resource service provider. The request may specify which metrics are to be collected to generate the data, the computing resources from which the data log streams are to be obtained, a time range during which the metrics data utilized to create the data log streams was collected, and the like. In response to the request, the computing resource monitoring service may query a data log stream index to identify any data log groups that include data log streams having start time that is within the specified time range.

In an example, the computing resource monitoring service transmits a request to a database service to obtain any data log streams identified in the data log stream index that would satisfy the customer's request. Based on the number of data log streams identified in the index, the computing resource monitoring service may construct a bit array for creation of a Bloom filter for identifying the data log streams processed by the computing resource monitoring service. The computing resource monitoring service may add each data log stream into the Bloom filter by setting a number of bits within the Bloom filter from zero to one. This serves to indicate that the entry corresponding to a particular data log stream is now within the Bloom filter. Thus, when a query is submitted for the entry, the computing resource monitoring service may determine that the entry is within the Bloom filter. The computing resource monitoring service may encode this Bloom filter into a continuation token, which may be used to identify any processed data log streams. Additionally, the computing resource monitoring service may specify, within the continuation token, which data log streams have not been completely processed and a resumption point for each of these data log streams. This continuation token may be provided to the customer to enable the customer to resume the search query at any time.

If the computing resource monitoring service receives a request to resume the search query, the computing resource monitoring service may obtain the continuation token from the request and identify which data log streams require further processing. In an example, the computing resource monitoring service queries the data log stream index to obtain a time-sorted ordering of data log streams having a start time within the time range specified by the customer. The computing resource monitoring service may utilize each entry within this ordering to determine whether the specified entry is included within the Bloom filter or otherwise specified in the continuation token. For instance, if a particular data log stream is specified within the continuation token or is incorporated into the Bloom filter, the computing resource monitoring service may determine that the data log stream is part of the current working set of data log streams that are being processed by the computing resource monitoring service or has been fully processed.

In some examples, if a data log stream specified in the data log stream index is not specified in the continuation token and is not in the Bloom filter, the computing resource monitoring service may add the data log stream to the current working set if its timestamp falls before the first data log stream in the current working set. The computing resource monitoring service may add the data log stream to the Bloom filter if the service is able to complete processing of the data log stream prior to completion of the search query. Otherwise, the computing resource monitoring service may add the data log stream to a new continuation token along with the updated Bloom filter such that the computing resource monitoring service may continue processing of any identified data log streams in response to a subsequent customer request to continue the search query for the data log streams. This process may be repeated until the customer or the computing resource monitoring service elects to stop requesting resumption of the search query or until no new search query results are identified that can be provided to the customer.

In this manner, the computing resource monitoring service may utilize probabilistic data structures, such as a Bloom filter, along with the continuation token to identify which data log streams are either being currently processed or have been processed by the computing resource monitoring service in response to a customer request for data associated with any number of computing resources. In addition, the techniques described and suggested within the present disclosure facilitate additional technical advantages. For instance, because the Bloom filter and the continuation token are used to define which data log streams have been processed or are still being processed, the computing resource monitoring service may maintain a stable view of which data log streams remain to be considered in response to a customer search query. Further, since the Bloom filter is stateless, identifying data log streams that have yet to be considered may be performed more efficiently, as the computing resource monitoring service may query the Bloom filter to identify which data log streams have not been considered.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a customer 102 (e.g., individual, organization, automated process, computing resource agent, etc.) of a computing resource service provider 106, through a user client device or other computing device, may submit a search query to a computing resource monitoring service 104 to obtain data corresponding to one or more computing resources 106 allocated to the customer 102 and maintained by the computing resource service provider 106. The search query may identify one or more metrics for the data that is to be collected on behalf of the customer 102, the one or more target computing resources 106, and a time range that may be used to identify any data log streams 110 from the computing resources 106 that have timestamps within the specified time range. The time range specified by the customer 102 in the search query may include a starting time, an ending time, or both. Alternatively, in some embodiments, the computing resource monitoring service 104 may select a starting time and an ending time automatically based at least in part on one or more rules. For instance, the computing resource monitoring service 104 may select a start time that is an hour prior to the time the search query was received by the computing resource monitoring service 104. It should be noted that while data log streams are used extensively throughout the present disclosure for the purpose of illustration, other data sources subject to any ordering may be used. For instance, the other data sources may be ordered based at least in time, quantitative measures, qualitative measures, and the like.

In an embodiment, the computing resource monitoring service 104 obtains, from a database service configured to store incoming data log streams 110 from the computing resources 106, a global search index for the data log streams. The index may specify which data log streams are available through the database service, as well as the time range during which measurements for a particular metric were recorded onto each data log stream obtained from the computing resources 106. A measurement may be a numerical value from a scale of possible values, a Boolean value, or an alphanumeric or other indicator of a state of a set of possible states. The measurement may further serve as an indication of at least one aspect of the operation of an associated computing resource, such as virtual machine instances, customer computer systems, object-based datastores and/or other computing resources. For instance, measurements may include processor usage over time, memory usage over time, a count for errors detected within a computing resource over a period of time, and the like.

The computing resource monitoring service 104 may identify, from the index, one or more data log streams 110 for the identified computing resources 106 that have a start time greater than the start time specified in the search query or defined by a rule of the computing resource monitoring service 104. Based at least in part on the identified one or more data log streams 110, the computing resource monitoring service 104 may construct a bit array. In an embodiment, the bit array is sized based at least in part on the number of data log streams 110 identified in the index whereby each data log stream may correspond to a predetermined number of bits. For instance, if eight thousand (8,000) data log streams are identified and ten (10) bits are assigned per data log stream, the resulting bit array may be one kilobyte in size.

In some embodiments, the computing resource monitoring service 104 transmits a request to the database service to obtain the identified data log streams 110 for processing. In response to obtaining the data log streams 110 from the database service, the computing resource monitoring service 104 may select a first data log stream and utilize the selected data log stream as input to an entry function that may be used to hash the data log stream. The hash result from the entry function may be used to set a number of bits within the bit array from zero to one, resulting in a Bloom filter 108 or other probabilistic data structure usable to determine which data log streams have been processed. It should be noted that while Bloom filters 108 are used extensively throughout the present disclosure for illustrative purposes, other probabilistic data structures may be used. A probabilistic data structure, in an embodiment, is a data structure configured such that, when maintained correctly, a query against the data structure (e.g., to determine whether an element is in a set) has a non-zero probability of being incorrect (e.g., due to a hash collision). For instance, in some embodiments, a probabilistic data structure is configured such that the probability of a false positive is below a specified threshold to balance the computational efficiency provided by the data structure with the inconvenience caused by security actions that are unnecessarily performed as a result of a false positive. Other examples of probabilistic data structures may include quotient filters, hash tables, compact approximators, and the like. Other techniques to mitigate against false positives, such as by reference to a database only when a violation is potentially detected, may be used such that additional computing resources are used to make sure there was a violation only when the potential of a violation having occurred has been detected.

The computing resource monitoring service 104 may utilize the entry function to hash each of the identified data log streams and to set a number of bits in the Bloom filter 108 from zero to one. This Bloom filter 108 may be encoded onto a continuation token that may be used to determine which data log streams 110 have been processed by the computing resource monitoring service 104 or a resumption point for processing of any data log streams 110 that could not be processed completely prior to termination of the search. For instance, in addition to the Bloom filter 108, the continuation token may identify a current bit for any data log stream that was being processed by the computing resource monitoring service 104 up to the time of termination of the search. In response to termination of the current search, the computing resource monitoring service 104 may transmit the results of the search, as well as the continuation token, to the customer 102 to fulfill the customer's search query. Thus, the continuation token may identify the data log streams that were included in the search and may also include an indication of the last bit analyzed by the computing resource monitoring service 104 prior to the end of the initial search period. The continuation token may be similar to a pagination token, which may include a timestamp of the last log event included in different pages of a search result. Pagination tokens are described in greater detail in U.S. patent application Ser. No. 14/843,850, filed Sep. 2, 2015, entitled "PARTITIONED SEARCH OF LOG EVENTS," which is hereby incorporated in its entirety by reference.

If the customer 102 wishes to continue the search, the customer 102 may submit an additional search query that includes the continuation token provided by the computing resource monitoring service 104. In an embodiment, the computing resource monitoring service 104 transmits a search query to the database service to obtain a time-sorted ordering of any available data log streams 110 from the various computing resources 106 that may be used to fulfill the customer's query. Additionally, the computing resource monitoring service 104 may obtain the continuation token included in the customer's query to determine whether there are newly introduced data log streams that are to be considered and to determine where to resume the search for data log streams that were not completely processed previously. For instance, the computing resource monitoring service 104 may select a data log stream from those identified in the global search index and determine whether the selected data log stream is identified in the continuation token as not having been completely processed. If the selected data log stream is identified in the continuation token as not having been completely processed, the computing resource monitoring service 104 may use the continuation token to identify the current bit and continue processing of the selected data log stream until completion. In response to completing processing of the data log stream, the computing resource monitoring service 104 may add the selected data log stream to the Bloom filter 108 included in the continuation token.

Alternatively, if the selected data log stream is not included in the ordering specified in the continuation token, the computing resource monitoring service 104 may determine whether the selected data log stream is included in the Bloom filter 108. If the selected data log stream is not included in the ordering specified in the continuation token or in the Bloom filter 108, the computing resource monitoring service 104 may add the selected data log stream to the current working set (e.g., the ordering specifying in-process data log streams) from the continuation token and process the selected data log stream based at least in part on where in the ordering the selected data log stream is in relation to the other identified data log streams. The computing resource monitoring service 104 may add the newly identified data log stream to the Bloom filter 108 if the newly identified data log stream is completely processed by the computing resource monitoring service 104. However, if the data log stream is not completely processed and the time period for the search has elapsed, the computing resource monitoring service 104 may add this newly identified data log stream to the ordering of in-process data log streams in the continuation token. Thus, the continuation token may be updated to include an updated ordering of in-process data log streams, as well as an updated Bloom filter 108 that can be used to identify any processed data log streams 112. The computing resource monitoring service 104 may provide this updated continuation token to the customer 102 to enable the customer 102 to submit later search queries if desired.

Figure 2:
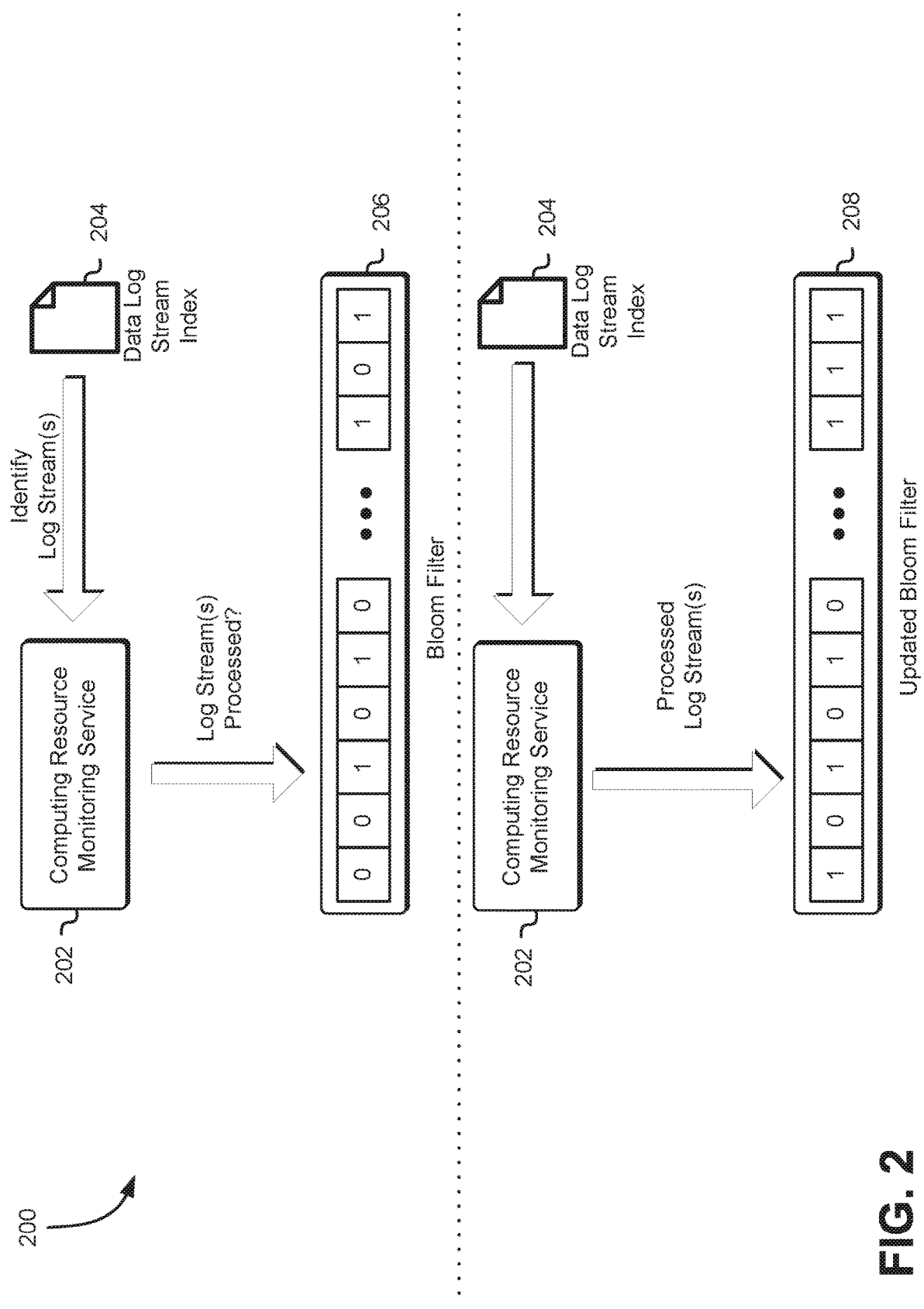
FIG. 2 shows an illustrative example of an environment in which a computing resource monitoring service updates a Bloom filter based at least in part on processing of data log streams from various computing resources in accordance with at least one embodiment.

As noted above, the computing resource monitoring service may utilize a global search index of available data log streams to identify one or more data log streams that may be used to satisfy a customer search query for data associated with one or more computing resources. For instance, in response to a search query from a customer that includes a continuation token, the computing resource monitoring service may utilize the continuation token to resume processing of data log streams specified in an ordering in the continuation token. Further, the continuation token may include a Bloom filter that may be used to determine which data log streams have been previously processed by the computing resource monitoring service. Accordingly, FIG. 2 shows an illustrative example of an environment 200 in which a computing resource monitoring service 202 updates a Bloom filter 206 based at least in part on processing of data log streams from various computing resources in accordance with at least one embodiment.

In the environment 200, the computing resource monitoring service 202 may interact with a data log stream index 204 (e.g., global search index) to identify one or more data log streams that may be used to fulfill a customer's search query. For instance, if a customer submits a search query that includes a continuation token that may be used to resume a prior search query submitted by the customer, the computing resource monitoring service 202 may utilize the continuation token to identify data log streams that require additional processing resulting from incomplete processing during a prior search query and to identify data log streams that have been processed previously. The continuation token may include an ordering of data log streams and the last bit analyzed by the computing resource monitoring service 202 prior to the end of the most recent search query. Additionally, the continuation token may include a Bloom filter 206 or other probabilistic data structure that may be used to determine whether a data log stream has been processed by the computing resource monitoring service 202 in response to a prior search query.

In response to a search query that includes a continuation token, the computing resource monitoring service 202 may transmit an index query to a database service to identify and obtain a time-sorted ordering of data log streams that may be used to fulfill the search query. In response to the index query, the database service may evaluate the data log stream index 204 to identify the one or more data log streams that may be used to fulfill the index query. In some embodiments, the computing resource monitoring service 202 transmits a request to the database service to obtain the data log stream index 204, which the computing resource monitoring service 202 may use to identify the data log streams necessary to fulfill the search query from the customer. For any data log streams not identified in the ordering of in-process data log streams specified in the continuation token, the computing resource monitoring service 202 may utilize each of these data log streams as input into an entry function to obtain an output that may be passed through the Bloom filter 206 to determine whether the output is present in the Bloom filter 206. For instance, if the output is present in the Bloom filter 206, the computing resource monitoring service 202 may determine that the particular data log stream has been processed and no additional processing of the data log stream is required.

If a particular data log stream is not included within the ordering of in-process data log streams specified in the continuation token or in the Bloom filter 206, the computing resource monitoring service 202 may add the particular data log stream to the ordering specified in the continuation token. This may enable the computing resource monitoring service 202 to process the particular data log stream along with any other data log streams specified in the ordering specified in the continuation token. The particular data log stream may be added to the ordering based at least in part on a starting timestamp of the particular data log stream.

As the computing resource monitoring service 202 processes data log streams specified in the ordering from the continuation token, the computing resource monitoring service 202 may utilize each of the processed data log streams as input into an entry function. The output of this entry function may be hashed and this hash result may be used to set a number of bits within the Bloom filter 206 from zero to one. This may serve to indicate that the entry corresponding to a processed data log stream is now within the Bloom filter 206. If the time allotted for the search query has elapsed without full processing of the identified data log streams, the computing resource monitoring service 202 may generate an updated continuation token. This updated continuation token may specify an updated ordering of in-process data log streams and the respective bit at which the computing resource monitoring service 202 is to resume processing should the customer submit a new search query that includes this updated continuation token. The updated continuation token may further include an updated Bloom filter 208 that can be used to identify any previously processed data log streams, including any data log streams processed during the most recent search query. This updated Bloom filter 208 may include additional bits set from zero to one than the original Bloom filter 206, as new data log streams are added to the Bloom filter after processing by the computing resource monitoring service 202.

Figure 3:
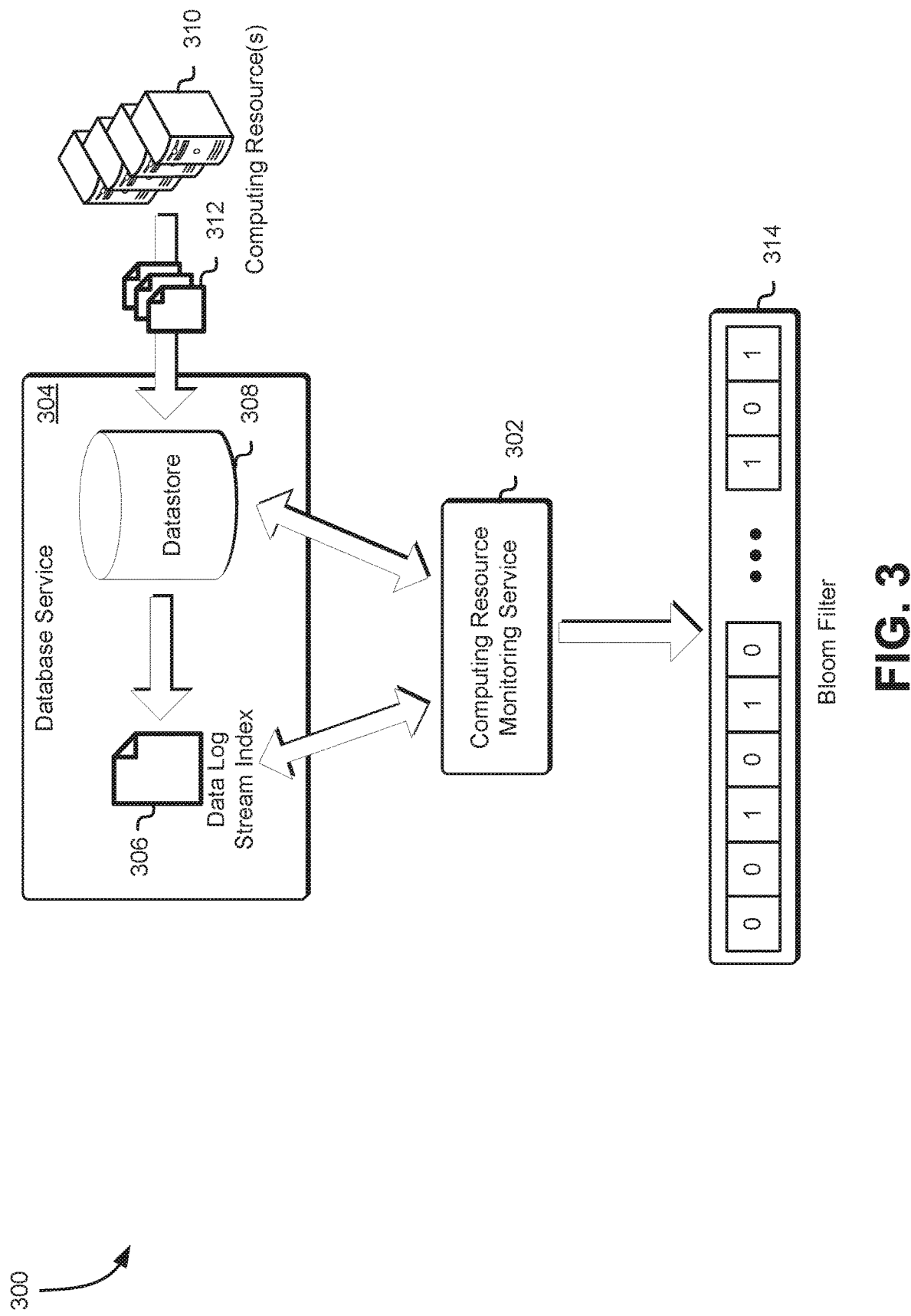
FIG. 3 shows an illustrative example of an environment in which a computing resource monitoring service processes data log streams and updates a Bloom filter in response to finalizing processing of a data log stream in accordance with at least one embodiment.

FIG. 3 shows an illustrative example of an environment 300 in which a computing resource monitoring service 302 processes data log streams 312 and updates a Bloom filter 314 in response to finalizing processing of a data log stream in accordance with at least one embodiment. The computing resource monitoring service 302 may include one or more computer systems configured to data log streams 312 from various computing resources 310 (e.g., computer systems and other devices (e.g., smartphones, smart watches, tablet computers, etc.)) to aggregate and analyze data of these computing resources 310 on behalf of one or more customers of a computing resource service provider. In an embodiment, the computing resource monitoring service 302 receives a search query from a customer of the computing resource service provider to provide data associated with one or more computing resources 310. The search query may specify a time range for the data that is to be obtained, as well as an ordering of one or more computing resources 310 for which the customer wants to obtain the data. In some embodiments, the computing resource monitoring service 302 can interact with an identity management service to identify any computing resources 310 associated with the customer, which the computing resource monitoring service 302 may use to provide the customer with an ordering of the available computing resources 310 for which data may be obtained.

In response to the search query from the customer, the computing resource monitoring service 302 may transmit an index query to a database service 304 in order to identify the one or more data log streams 312 that may be used to fulfill the customer search query. The database service 304 may comprise one or more computer systems that are configured to store data for customers, computing resources, and the like. The database service 304 may include a data log stream index 306, which may specify the one or more data log streams 312 obtained from various computing resources 310 and stored within a datastore 308 of the database service 304. The datastore 308 may comprise a plurality of data storage devices configured to obtain and store data log streams 312 from various computing resources 310. The datastore 308 may be organized based at least in part on the origination computing resource 310 for each of the data log streams 312. Alternatively, the data log streams 312 may be stored within the datastore 308 based at least in part on the data storage devices available. The datastore 308 may further include one or more computer systems configured to track the receipt and storage of any incoming data log streams 312, as well as updating the data log stream index 306 to indicate where the data log streams 312 are stored within the datastore 308.

The database service 304, in response to the index query from the computing resource monitoring service 302, may transmit an ordering of the available data log streams 312 stored within the datastore 308 that may fulfill the customer search query. In an alternative embodiment, the computing resource monitoring service 302 obtains the data log stream index 306 from the database service 304 and identifies the one or more available data log streams 312 that may be used to fulfill the customer search query. The computing resource monitoring service 302 may transmit a request to the datastore 308 to obtain the identified data log streams and begin processing the data in these data log streams on behalf of the customer. Additionally, based at least in part on the number of data log streams identified in the data log stream index 306 and obtained from the datastore 308, the computing resource monitoring service 302 may construct a bit array that can be used to create a Bloom filter 314 for identifying the data log streams processed by the computing resource monitoring service 302. The computing resource monitoring service 302 may use each data log stream as an individual input into an entry function. The output of this entry function may be hashed and this hash result may be used to set a number of bits within a Bloom filter 314 from zero to one. This serves to indicate that the entry corresponding to a particular data log stream is now within the Bloom filter 314.

If the search query is not completed after a particular period of time, as defined by the configuration of the computing resource monitoring service 302, the computing resource monitoring service 302 may generate a continuation token that specifies an ordering of data log streams that were not completely processed and a corresponding bit at which the computing resource monitoring service 302 may resume processing. Further, the continuation token may include the aforementioned Bloom filter 314, which may be used to identify any data log streams that have been processed by the computing resource monitoring service 302. The computing resource monitoring service 302 may provide a response to the search query, including data garnered from processing the identified data log streams 312 and the continuation token. This may enable the customer to submit the same search query along with the continuation token at a later time, which the computing resource monitoring service 302 may utilize to resume processing of the data log streams 312.

If the computing resource monitoring service 302 receives a request to perform a search query, and the request includes a continuation token, the computing resource monitoring service 302 may transmit a new index query to the database service 304 to obtain a new ordering of data log streams 312 stored in the datastore 308 that may be used to fulfill the request. The computing resource monitoring service 302 may select a data log stream from the new ordering from the data log stream index 306 to determine whether the data log stream is identified within the ordering of in-process data log streams specified in the continuation token. If the selected data log stream is identified in the ordering of in-process data log streams, the computing resource monitoring service 302 may resume processing of the selected data log stream starting at the specified bit. However, if the selected data log stream is not identified in the ordering of in-process data log streams, the computing resource monitoring service 302 may utilize the selected data log stream as input into an entry function. The computing resource monitoring service 302 may hash the output of the entry function and utilize the Bloom filter 314 to determine whether the hashed output is included in the Bloom filter 314. If the hashed output is in the Bloom filter 314, the computing resource monitoring service 302 may determine that the selected data log stream has been processed during processing of a previous search query for the customer.

In an embodiment, if the selected data log stream is not specified in the ordering included in the continuation token or in the Bloom filter 314, the computing resource monitoring service 302 will add the selected data log stream to the ordering of in-process data log streams from the continuation token. The computing resource monitoring service 302 may resume processing of any data log streams specified in the ordering from the continuation token, including any data log streams added to this ordering, until processing has been completed for the data log streams specified in the ordering or until a pre-programmed period of time for performance of the data log stream analysis has elapsed. If the computing resource monitoring service 302 is unable to complete processing of the data log streams specified in the ordering from the continuation token, the computing resource monitoring service 302 may generate a new continuation token that specifies an updated ordering of in-process data log streams and the corresponding bit at which to resume processing. Further, any processed data log streams may be added to the Bloom filter 314 such that the Bloom filter 314 represents the data log streams processed during all prior search queries submitted by the customer for a particular time range and for particular computing resources. This updated Bloom filter 314 may be added to the newly generated continuation token. The computing resource monitoring service 302 may provide this newly generated continuation token to the customer to enable the customer to submit a request to resume the search query.

Figure 4:
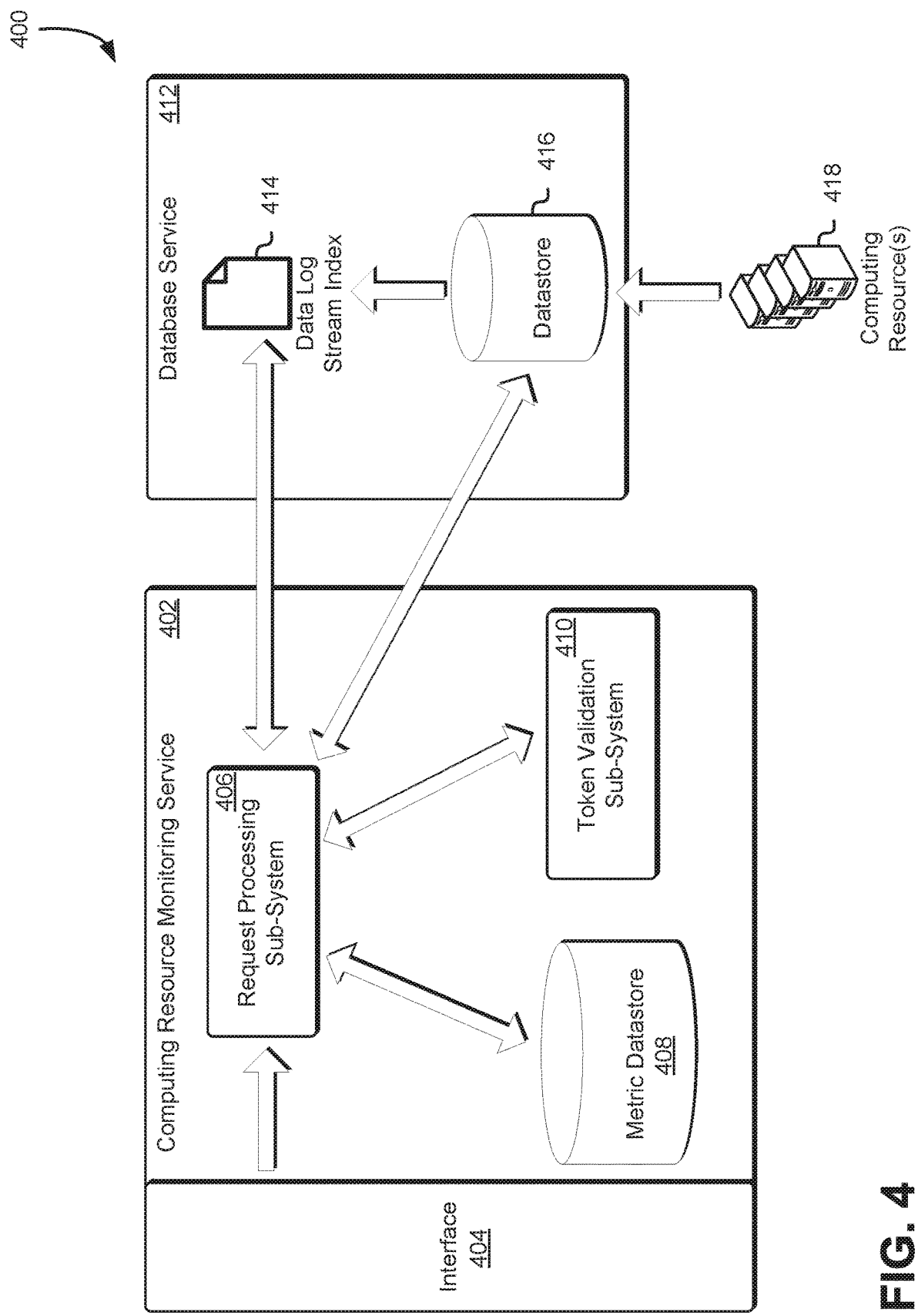
FIG. 4 shows an illustrative example of an environment in which a computing resource monitoring service interacts with a database service to process data log streams from various computing resources in accordance with at least one embodiment.

FIG. 4 shows an illustrative example of an environment 400 in which a computing resource monitoring service 402 interacts with a database service 412 to process data log streams from various computing resources 418 in accordance with at least one embodiment. In the environment 400, the computing resource monitoring service 402 may include one or more components that may be utilized to process and fulfill search queries from customers of the computing resource service provider. For instance, the computing resource monitoring service 402 may include an interface 404, which may comprise one or more computer systems or applications configured to obtain requests from customers of the computing resource service provider and provide information to the customer in response to these requests. The interface 404 may include a graphical user interface (GUI) which a customer may use to specify the parameters of a search request to be provided to the computing resource monitoring service 402. For instance, the interface 404 may include a time range field, which the customer may use to specify the time range for which data is to be provided for one or more computing resources 418. Additionally, the interface 404 may include one or more computing resource fields that the customer may use to select the one or more computing resources 418 for which the requested data is to be obtained. In some examples, the interface 404 is configured to receive one or more application programming interface (API) calls from the customer to perform the specified search query. These API calls may specify the time range and the computing resources 418 for which the data is to be obtained.

The interface 404 may provide the search query to the request processing sub-system 406, which may include one or more computer systems configured to process any incoming requests from customers and to interact with other services provided by the computing resource service provider to obtain data and other information necessary to fulfill the requests. For instance, the request processing sub-system 406, in response to an incoming search query from the interface 404 and provided by a customer, may transmit a request to the database service 412 to determine an ordering of data log streams available that may be processed to fulfill the search query. In response to the request, the database service 412 may evaluate a data log stream index 414 to identify the data log streams that may be used to fulfill the search query. The data log stream index 414 may specify, for each data log stream stored within the datastore 416, a start and end time for the data log stream, the associated computing resource, and the one or more metrics collected within the data log stream.

Each computing resource 418 may include an agent, application, or process configured to aggregate data for a variety of metrics over time into data log streams. This agent, application, or process may transmit the data log streams to a datastore 416 of the database service 412, where the data log streams may be catalogued and stored. For instance, the database service 412 may update the data log stream index 414 in response to new data log streams having been stored within the datastore 416. In an embodiment, the database service 412 provides a time-sorted ordering of one or more data log streams stored in the datastore 416 that may be used to fulfill the search query from the customer. In an alternative embodiment, the request processing sub-system 406 obtains the data log stream index 414 from the database service 412 and makes the determination as to which data log streams in the datastore 416 may be used to fulfill the search query from the customer.

Based at least in part on the number of data log streams identified in the data log stream index 414, the request processing sub-system 406 may construct a bit array that may be used to determine whether particular data log streams has been processed by the request processing sub-system 406. The request processing sub-system 406 may further input each data log stream identified in data log stream index 414 and obtained from the datastore 416 into an entry function. The request processing sub-system 406 may hash the output from this entry function and add the hashed output into the bit array to construct a Bloom filter or other probabilistic data structure that may be used to determine whether a data log stream has been processed by the request processing sub-system 406.

In an embodiment, the request processing sub-system 406 processes the identified data log streams obtained from the datastore 416 to obtain data for a variety of metrics specified by the customer in its search query. The request processing sub-system 406 may be configured to process these data log streams over a pre-programmed period of time. If the request processing sub-system 406 is unable to complete processing of the identified data log streams during the allotted time period, the request processing sub-system 406 may generate an ordering of any data log streams that were not completely processed. The ordering of data log streams may also be time-sorted such that data log streams having an earlier timestamp may be processed first upon resumption. Further, the ordering of data log streams may specify, for each data log stream, a particular bit where the request processing sub-system 406 may continue processing of the data log stream at a later time.

The request processing sub-system 406 may generate a continuation token, which may be used to specify the time-sorted ordering of the data log streams that were not completely processed during the allotted time. In an embodiment, the request processing sub-system 406 also encodes the newly created Bloom filter into the continuation token. Thus, the continuation token may be used to identify any data log streams that have been processed by the request processing sub-system 406 and any data log streams that were not completely processed at the expiration of the allotted time. Additionally, the request processing sub-system 406 may store any data obtained from the processed data log streams into a metric datastore 408, which may include one or more storage devices that may be used to store any data requested by customers of the computing resource service provider. Further, the metric datastore 408 may serve as a cache for any data obtained from any partially processed data log streams. This may enable the request processing sub-system 406 to resume processing of data log streams without duplicating any data previously obtained from these data log streams.

The request processing sub-system 406 may transmit any data obtained through processing of the search query to the customer through the interface 404 or any other preferred communications method. Additionally, the request processing sub-system 406 may transmit the newly created continuation token to the customer. This may enable the customer to submit a new request to the computing resource monitoring service 402, through the interface 404, to resume the search query for data associated with particular computing resources 418 and for a particular time range. This new request may include the continuation token provided by the request processing sub-system 406.

In response to the new request to resume the search query, the request processing sub-system 406 may transmit the continuation token included in the request to a token validation sub-system 410 to determine whether the provided continuation token is a valid continuation token that may be used to identify any partially processed data log streams and any fully processed data log streams. If the continuation token is verified by the token validation sub-system 410 as being valid, the request processing sub-system 406 may transmit an index query to the database service 412 to obtain a time-sorted ordering of data log streams corresponding to the parameters specified in the search query from the customer. This time-sorted ordering of data log streams may include additional data log streams that have since been stored within the datastore 416 and, thus, not previously been analyzed and processed by the request processing sub-system 406.

The request processing sub-system 406 may select a data log stream from the one or more data log streams specified in the data log stream index 414 and obtain the selected data log stream from the datastore 416. If the selected data log stream is specified in the ordering of data log streams that were not completely processed in response to a previous search query, the request processing sub-system 406 may resume processing of the selected data log stream based at least in part on its location in the ordering. If the selected data log stream is processed completely, the request processing sub-system 406 may add the selected data log stream to the Bloom filter if it has not been previously added during a prior search query iteration. However, if the selected data log stream is not specified in the ordering of partially processed data log streams, the request processing sub-system 406 may evaluate the Bloom filter from the continuation token to determine whether the selected data log stream is included in the Bloom filter. If the selected data log stream is not included in the Bloom filter, the request processing sub-system 406 may add the selected data log stream to the ordering of partially processed data log streams from the continuation token based at least in part on the timestamp of the selected data log stream.

Based at least in part on the updated ordering of partially processed data log streams and the data log streams included in the Bloom filter, the request processing sub-system 406 may resume processing of any data log streams specified in the ordering. If the request processing sub-system 406 completes processing of a data log stream specified in the ordering, the request processing sub-system 406 may remove the data log stream from the ordering and add the data log stream to the Bloom filter to indicate successful processing of the selected data log stream. Further, the request processing sub-system 406 may store the data obtained from the selected data log stream in the metric datastore 408, where it may be catalogued and stored. However, if the allotted time for processing of data log streams in response to the search query expires, the request processing sub-system 406 may generate a new continuation token that includes the updated Bloom filter and an updated ordering of the partially processed data log streams. This updated ordering of the partially processed data log streams may specify, for each data log stream, a bit at which the request processing sub-system 406 may resume processing of the data log stream.

The request processing sub-system 406 may store any data obtained from the processed data log streams in the metric datastore 408 where it may be available to the customer in response to any queries for the data. In response to the customer's search query, the request processing sub-system 406 may transmit the obtained data from the data log streams, as well as the new continuation token, to the customer to fulfill the search query. In some embodiments, if the request processing sub-system 406 was able to process all identified data log streams to obtain the requested data, the request processing sub-system 406 will provide the requested data and indicate that the data log streams were successfully processed by the request processing sub-system 406. The request processing sub-system 406 may further provide a continuation token that only includes the updated Bloom filter. This may enable the customer to submit a later request to resume the search query in order to potentially find any data from newly obtained data log streams from the computing resources 418 that satisfy the parameters of the search query.

Figure 5:
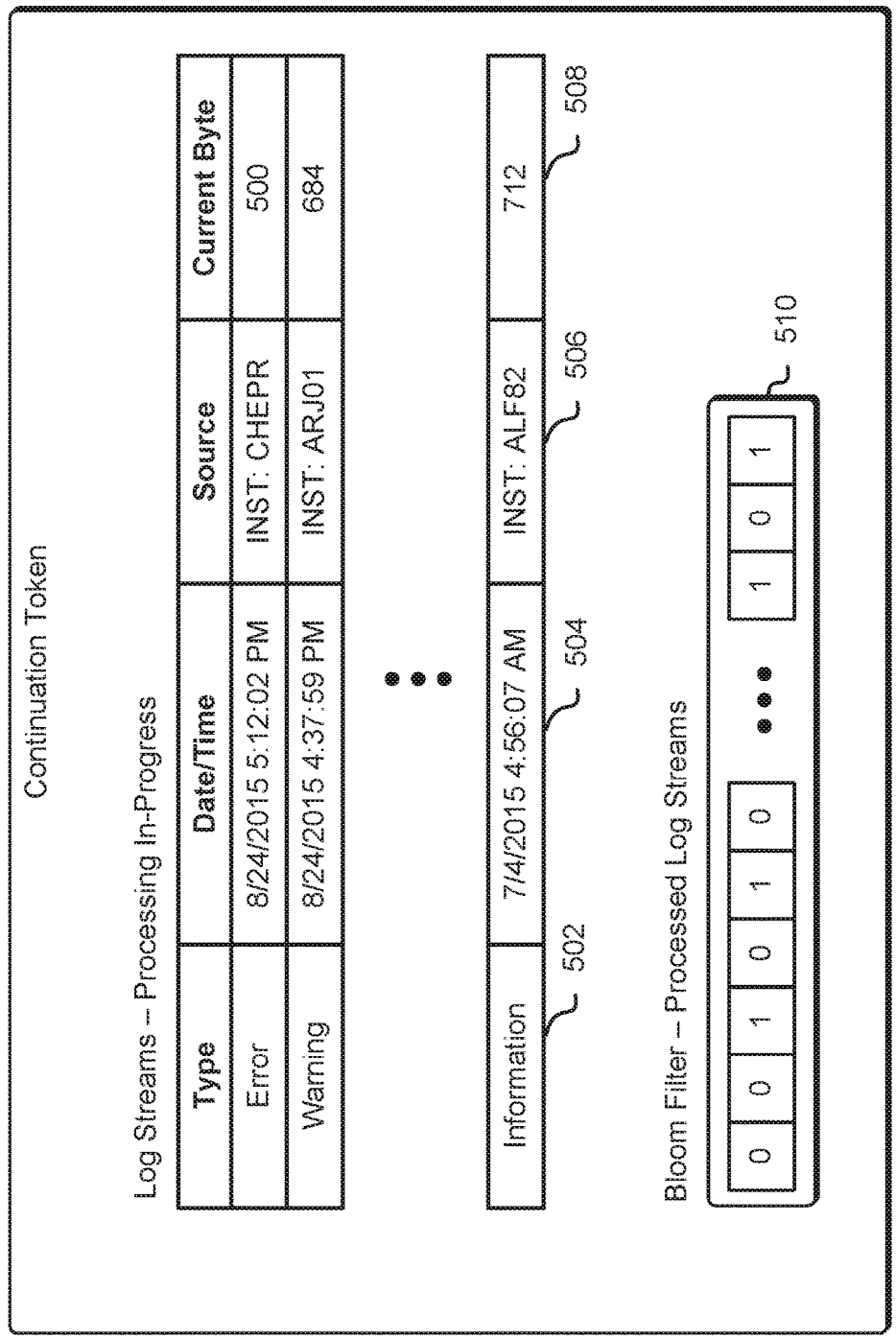
FIG. 5 shows an illustrative example of a continuation token for identifying data log streams that have been processed or that are still being processed in accordance with at least one embodiment.

As noted above, the computing resource monitoring service may generate a continuation token comprising an ordering of data log streams that have been partially processed by the computing resource monitoring service and a Bloom filter that may be used to identify any data log streams that have been completely processed by the computing resource monitoring service. The continuation token may be provided to a customer that submitted a search query for data associated with one or more computing resources and obtained from data log streams collected over a particular time range. For instance, each search query may be allotted a particular amount of time before a response is provided to the customer. If the computing resource monitoring service is unable to complete processing of all identified data log streams, the computing resource monitoring service may generate a continuation token that may be provided to the customer along with any data collected from the data log streams in response to its request. Further, the continuation token may be utilized to determine where to resume processing of the data log streams. Accordingly, FIG. 5 shows an illustrative example of a continuation token 500 for identifying data log streams that have been processed or that are still being processed in accordance with at least one embodiment.

The continuation token 500 may specify an ordering of data log streams that have been partially processed by the computing resource monitoring service during previous processing of search queries from a customer. The ordering of these partially processed data log streams may be time-sorted, such that the first specified data log stream may have the most recent timestamp. However, it should be noted that the ordering may be sorted in alternative ways. For instance, the ordering of partially processed data log streams may be generated based at least in part on the types of data log streams, the timestamp of the data log streams, the source of the data log streams, and the like.

The ordering of data log streams in the continuation token 500 may include various fields used to identify each data log stream specified in the continuation token 500. For instance, as illustrated in FIG. 5, the ordering of data log streams may include a data log stream type field 502, a date and time field 504, a source field 506, and a current byte field 508, although the ordering of data log streams may include additional and/or alternative fields as deemed necessary by an administrator or other privileged user of the computing resource service provider. The data log stream type field 502 may be used in the continuation token 500 to specify the type of data log stream obtained from the database service. For instance, as illustrated in FIG. 5, the data log streams specified in the ordering may correspond to detected errors, warnings detected by the associated computing resource, or information gathered by the associated computing resource, although additional types of data log streams may be available. For instance, the data log stream type field 502 may be used to denote the data metric for the data log stream.

The date and time field 504 of the continuation token may be used to denote the timestamp for the data log stream that has been partially processed by the computing resource monitoring service. As noted above, the ordering of the data log streams may be ordered based at least in part on the entries in this field 504 such that the most recently obtained data log stream is first in the ordering. Alternatively, the ordering of data log streams may be ordered such that the oldest data log stream is specified first. The source field 506 may specify an identifier for the computing resource from which the data log stream was obtained. The current byte field 508 may be used by the computing resource monitoring service to denote the last byte processed by the computing resource monitoring service for the particular data log stream. Thus, in response to obtaining the continuation token 500 from a customer in a request to resume processing of a search query, the computing resource monitoring service may evaluate the current byte field 508 to determine where to resume processing of a data log stream specified in the ordering.

In addition to the ordering of partially processed data log streams, the continuation token 500 may further encode a Bloom filter 510 or other probabilistic data structure that may be used to denote any completely processed data log streams. As noted above, based at least in part on the number of data log streams identified in the data log stream index, the computing resource monitoring service may construct a bit array that can be used to create a Bloom filter for identifying the data log streams processed by the computing resource monitoring service. The computing resource monitoring service may use each data log stream as an individual input into an entry function. The output of this entry function may be hashed and this hash result may be used to set a number of bits within a Bloom filter from zero to one. This serves to indicate that the entry corresponding to a particular data log stream is now within the Bloom filter. Thus, in response to obtaining a new ordering of data log streams that may be used to fulfill a customer's search query, the computing resource monitoring service may determine whether the data log streams identified in the index are included in the Bloom filter 510. Any data log streams not identified in the ordering of partially processed data log streams or in the Bloom filter 510 may be added to the ordering of partially processed data log streams to enable the computing resource monitoring service to process these newly identified data log streams. Further, as data log streams are successfully processed from the ordering, the computing resource monitoring service may update the partially processed data log stream ordering to remove the processed data log streams. Additionally, the computing resource monitoring service may update the Bloom filter 510 by adding the newly processed data log streams to the Bloom filter 510.

As noted above, the computing resource monitoring service may receive one or more requests from customers of the computing resource service provider to search for and obtain data associated with computing resources of the customer.

Figure 6:
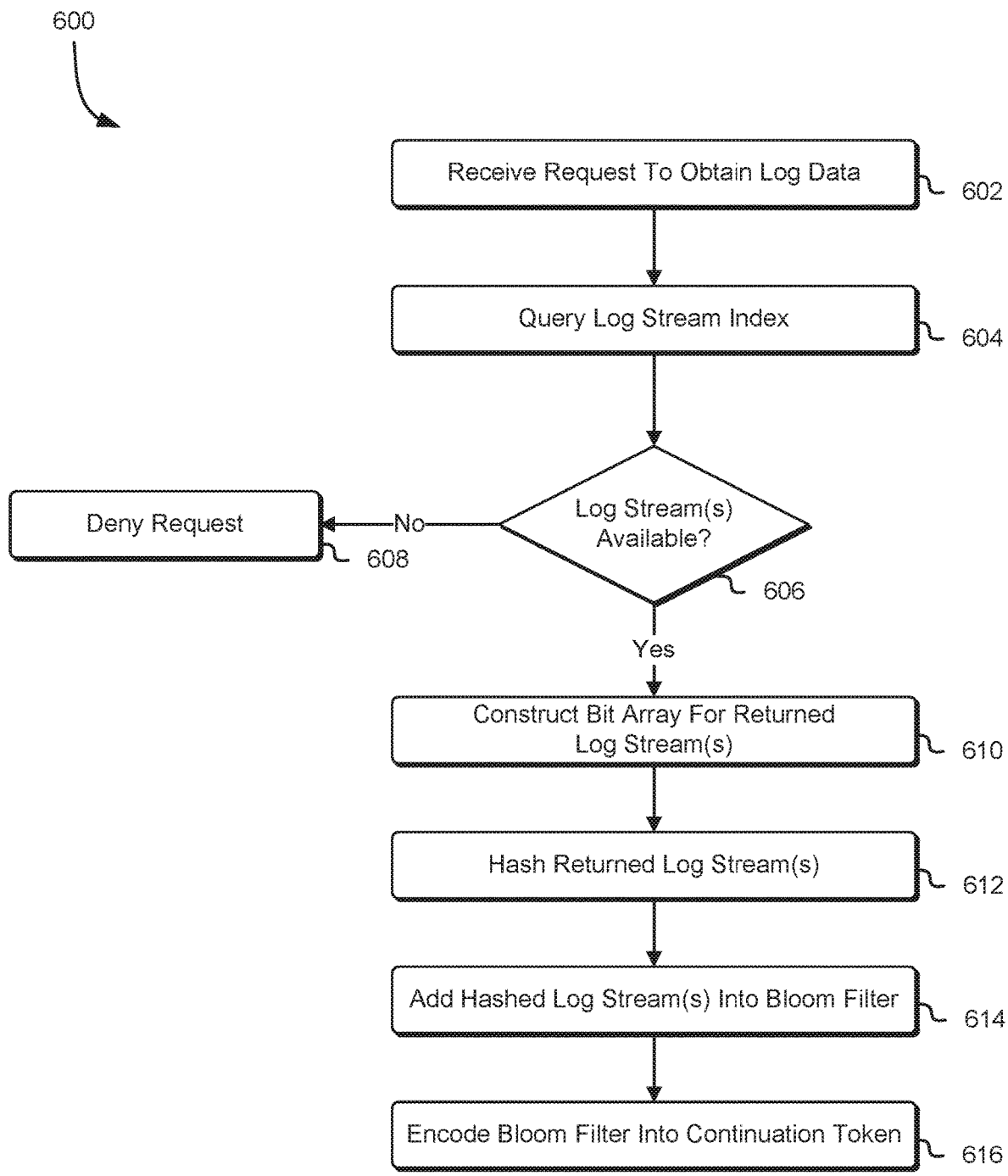
FIG. 6 shows an illustrative example of a process for encoding a Bloom filter into a continuation token for identified data log streams from various computing resources in accordance with at least one embodiment.

The request may identify the one or more computing resources for which data is to be obtained, as well as a time range for the data and the metrics that are to be collected from this data. In response to the request, the computing resource monitoring service may identify and analyze particular data log streams that may be used to fulfill the request to obtain the requested data. If an allotted time period for performance of the search query elapses without completion of processing of the identified data log streams, the computing resource monitoring service may generate a continuation token that includes a Bloom filter that may be used to determine which data log streams have been processed by the computing resource monitoring service. Accordingly, FIG. 6 shows an illustrative example of a process 600 for encoding a Bloom filter into a continuation token for identified data log streams from various computing resources in accordance with at least one embodiment. The process 600 may be performed by the aforementioned computing resource monitoring service, which may be configured to obtain and process data log streams from a database service. Further, this computing resource monitoring service may be configured to generate continuation tokens if the processing of the data log streams is not completed prior to the end of the allotted time period for performance of the search query.

At any time, the computing resource monitoring service may receive 602 a new request to obtain log data corresponding to one or more metrics and from one or more computing resources associated with a customer. The request may specify the target computing resources from which the data is to be obtained, a time range for the data (e.g., start time, end time, or both), and the metrics for which the data is to be obtained. The request may further include elements of a customer's credentials, which may be used to authenticate the customer and determine whether the customer is authorized to submit such a request for data.

In response to the request from the customer to obtain data for particular metrics from selected computing resources, the computing resource monitoring service may query 604 a data log stream index to determine 606 whether there are any data log streams available from the selected computing resources and for the specified time range that include the necessary data for fulfilling the customer's request. As described above in greater detail, each computing resource may include an agent configured to aggregate data over time into one or more data log streams that are provided to a database service for storage. This database service may store the data log streams within a datastore and update the data log stream index to indicate where the newly obtained data log streams are stored within the datastore. In an embodiment, the database service obtains the query from the computing resource monitoring service and utilizes the data log stream index to identify any data log streams that may be used to fulfill the request. In an alternative embodiment, the computing resource monitoring service obtains the data log stream index from the database service and determines which data log streams may be utilized to fulfill the request.

If there are no data log streams available that can be used to fulfill the customer's request, the computing resource monitoring service may deny 608 the request and notify the customer that no data is available that satisfies the customer's specified criteria. However, if the computing resource monitoring service identifies one or more data log streams that may be used to fulfill the customer's request, the computing resource monitoring service may construct 610 a bit array comprising a number of bits proportional to the number of identified data log streams from the data log stream index. For instance, the computing resource monitoring service may be configured to apportion a pre-determined number of bits per identified data log stream to generate the bit array. In some embodiments, the computing resource monitoring service is configured to select the number of bits per identified data log stream based at least in part on a desired false positive error rate for a probabilistic function that is to be generated. For instance, the computing resource monitoring service may estimate the number of elements that are to be included in the bit array and select a value for the number of bits per data log stream identified in the index. The number of elements may be greater than the actual number of identified data log streams specified in the index.

Based at least in part on the estimated number of elements that are to be included in the bit array and the number of bits per data log stream selected, the computing resource monitoring service may calculate an optimal value for the number of hashing functions that may be used to obtain an output value that may be used to set a number of bits in the bit array from zero to one. The computing resource service provider may utilize the number of hashing functions, the estimated number of elements, and the number of bits for the bit array to calculate the estimated false positive rate for the bit array. If the resulting false positive rate is too high, the computing resource monitoring service may adjust the number of bits for the bit array by allocating a greater number of bits per identified data log stream and use these updated values to calculate a new estimated false positive rate for the bit array. If an acceptable false positive rate is achieved, then the computing resource monitoring service may utilize the bit array as a Bloom filter that may be used to identify processed data log streams.

The computing resource monitoring service may transmit a request to the database service to obtain the data log streams identified in the data log stream index. In response to obtaining the requested data log streams, the computing resource monitoring service may input each of the data log streams into one or more hashing functions (e.g., entry functions) to hash 612 the data log streams and obtain an output that may be added to the Bloom filter. This may cause the computing resource monitoring service to add 614 the hashed data log streams into the Bloom filter such that one or more bits of the Bloom filter are changed from zero to one. Thus, the Bloom filter may be used to identify, subject to a false positive rate, whether a data log stream is included in the Bloom filter.

At the end of the allotted time period for processing of the customer's request, the computing resource monitoring service may determine whether the identified data log streams have been processed completely. If not, the computing resource monitoring service may generate a continuation token that specifies an ordering of partially processed data log streams and a bit for each partially processed data log stream at which the computing resource monitoring service may resume processing. Additionally, the computing resource monitoring service may encode 616 the Bloom filter into the continuation token. The Bloom filter may be used to identify the data log streams specified in the data log stream index during this first iterative search cycle. Thus, if a data log stream is not identified in the ordering of partially processed data log streams, the computing resource monitoring service may utilize the Bloom filter to determine whether a particular data log stream has been processed or has not been processed by the computing resource monitoring service. The computing resource monitoring service may transmit the continuation token, along with any data obtained from the data log streams, to the customer to fulfill the customer's request and to enable the customer to submit a later request to resume a search for the requested data.

Figure 7:
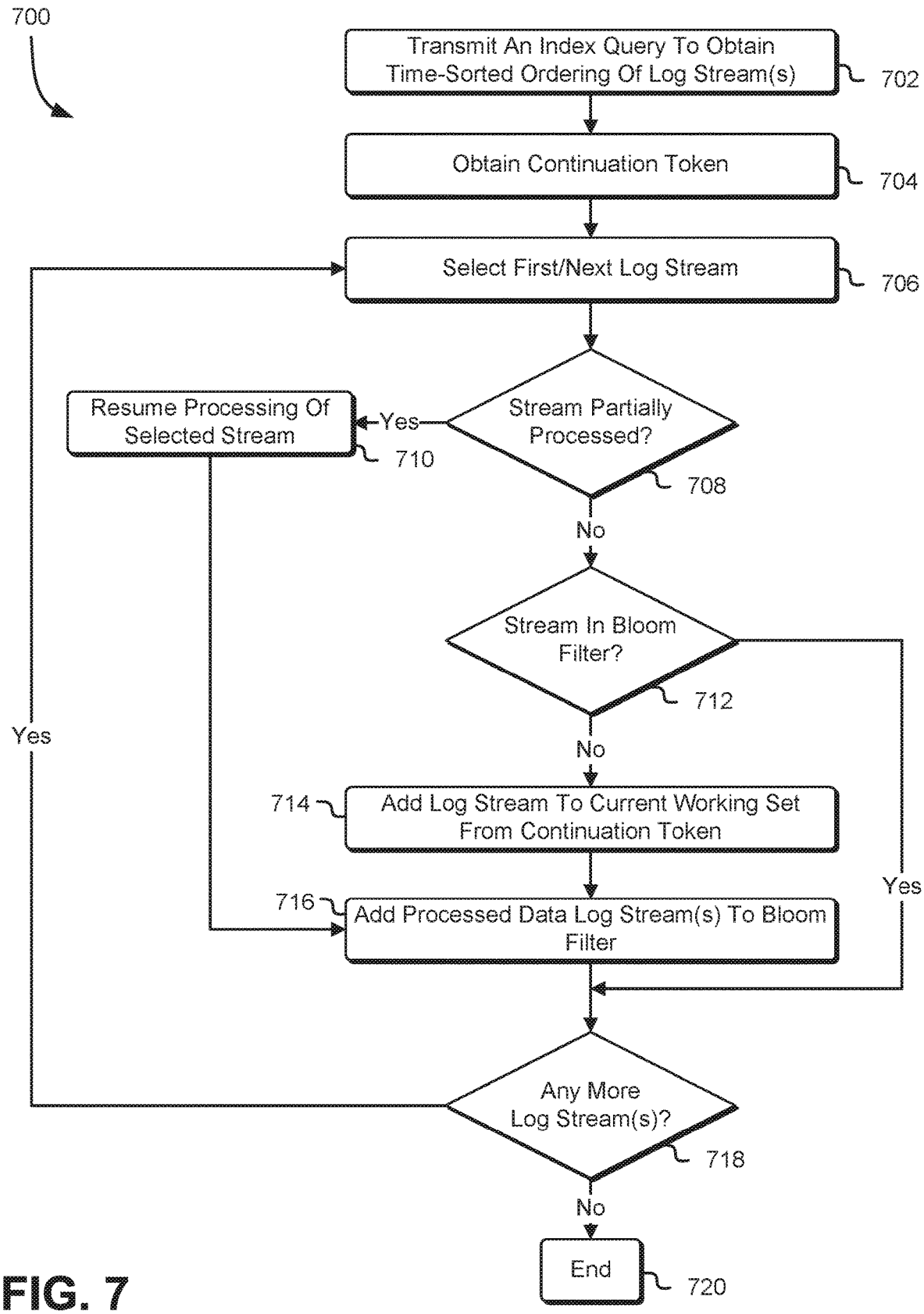
FIG. 7 shows an illustrative example of a process for utilizing a continuation token to resume processing of identified data log streams and updating a Bloom filter for any processed data log streams in accordance with at least one embodiment.

As noted above, the computing resource monitoring service may receive a request to resume a previously initiated search query for data associated with one or more computing resources on behalf of a customer. The request may include a continuation token, which may be used to determine where to resume processing of any partially processed data log streams as well as to determine which data log streams have been processed by the computing resource monitoring service during an earlier search cycle. Accordingly, FIG. 7 shows an illustrative example of a process 700 for utilizing a continuation token to resume processing of identified data log streams and updating a Bloom filter for any processed data log streams in accordance with at least one embodiment. The process 700 may be performed by a computing resource monitoring service in response to a customer request to resume a search query for obtaining data associated with one or more computing resources. The request may further include a continuation token, which may be used to identify partially processed and completely processed data log streams.

In response to a request to resume a search query on behalf of a customer, the computing resource monitoring service may transmit 702 a data stream index query to obtain a time-sorted ordering of data log streams that may be used to fulfill the customer's request. For instance, the computing resource monitoring service may obtain the data log stream index from the database service and identify any data log streams specified in the index that satisfy the parameters of the customer's query. Alternatively, the computing resource monitoring service may transmit a request to the database service to identify the one or more data log streams that satisfy the parameters of the customer's query. This may cause the database service to evaluate the data log stream index and prepare the time-sorted ordering of the data log streams. The database service may then provide the time-sorted ordering of the data log streams to the computing resource monitoring service to fulfill the request. This time-sorted ordering of the data log streams may be different from a time-sorted ordering of data log streams used in response to previous search queries and used to create the continuation token.

The computing resource monitoring service may further obtain 704 the continuation from the customer's request to resume the search query. As noted above, the continuation token may specify an ordering of partially processed data log streams and a Bloom filter that may be used to identify any processed data log streams. With possession of the continuation token, the computing resource monitoring service may select 706, from the time-sorted ordering of data log streams obtained from the data log stream index, a first data log stream. The selection of the first data log stream may be based at least in part on the data log stream's position in the time-sorted ordering of data log streams from the data log stream index.

The computing resource monitoring service may use the selected data log stream and the continuation token to determine 708 whether the selected data log stream has been partially processed during a previous search query iteration and is thus included in the ordering specified in the continuation token. If the selected data log stream is specified in the continuation token as having been partially processed by the computing resource monitoring service, the computing resource monitoring service may resume 710 processing of the selected data log stream. However, if the selected data log stream is not specified in the ordering of partially processed data log streams, the computing resource monitoring service may determine 712 whether the selected data log stream is included in the Bloom filter obtained from the continuation token. For instance, the computing resource monitoring service may use the selected data log stream as input into one or more hashing functions to obtain a hash of the selected data log stream. The computing resource monitoring service may query the Bloom filter to determine if the hash of the selected data log stream is included in the Bloom filter.

If the selected data log stream is not included in the Bloom filter, the computing resource monitoring service may add 714 the selected data log stream to the current working set of data log streams that are to be processed. For instance, the computing resource monitoring service may determine where, in the ordering of partially processed data log streams, the selected data log stream may be added to the ordering. As an illustrative example, the computing resource monitoring service may evaluate the timestamp of the selected data log stream and the timestamps of the data log streams specified in the continuation token. Based at least in part on this evaluation, the computing resource monitoring service may determine where in the ordering specified in the continuation token the selected data log stream is to be placed for processing. While timestamps are used extensively throughout the present disclosure to determine placement of a data log stream in the ordering of partially processed data log streams, other metrics may be used to determine placement of a data log stream. For instance, the ordering of partially processed data log streams may be ordered based at least in part on the progress made in processing each of the data log streams specified in the ordering.

As the computing resource monitoring service completes processing of the data log streams specified in the ordering of partially processed data log streams from the continuation token, the computing resource monitoring service may add 716 these processed data log streams to the Bloom filter. For instance, the computing resource monitoring service may utilize these data log streams as input to one or more hash functions to generate an output for each data log stream. This output may be added to the Bloom filter to indicate that these data log streams have been processed. The computing resource monitoring service may determine 718 whether any other data log streams need to be evaluated to determine their presence in the continuation token or if they need to be added to the ordering of data log streams that need to be processed. If so, the computing resource monitoring service may select another data log stream.

If there no additional data log streams to evaluate, the computing resource monitoring service may continue processing the data log streams and updating the Bloom filter as necessary. If the allotted time period for performance of the search query expires, the computing resource monitoring service may generate a new continuation token that encodes an updated Bloom filter and an updated ordering of partially processed data log streams. The computing resource monitoring service may provide this new continuation token, along with any data obtained in response to the latest search query, to the customer to fulfill its request. This may enable the customer to submit a later request to resume the search query at the specified bit for each identified data log stream and to identify newly obtained data log streams, if any, for processing.

Figure 8:
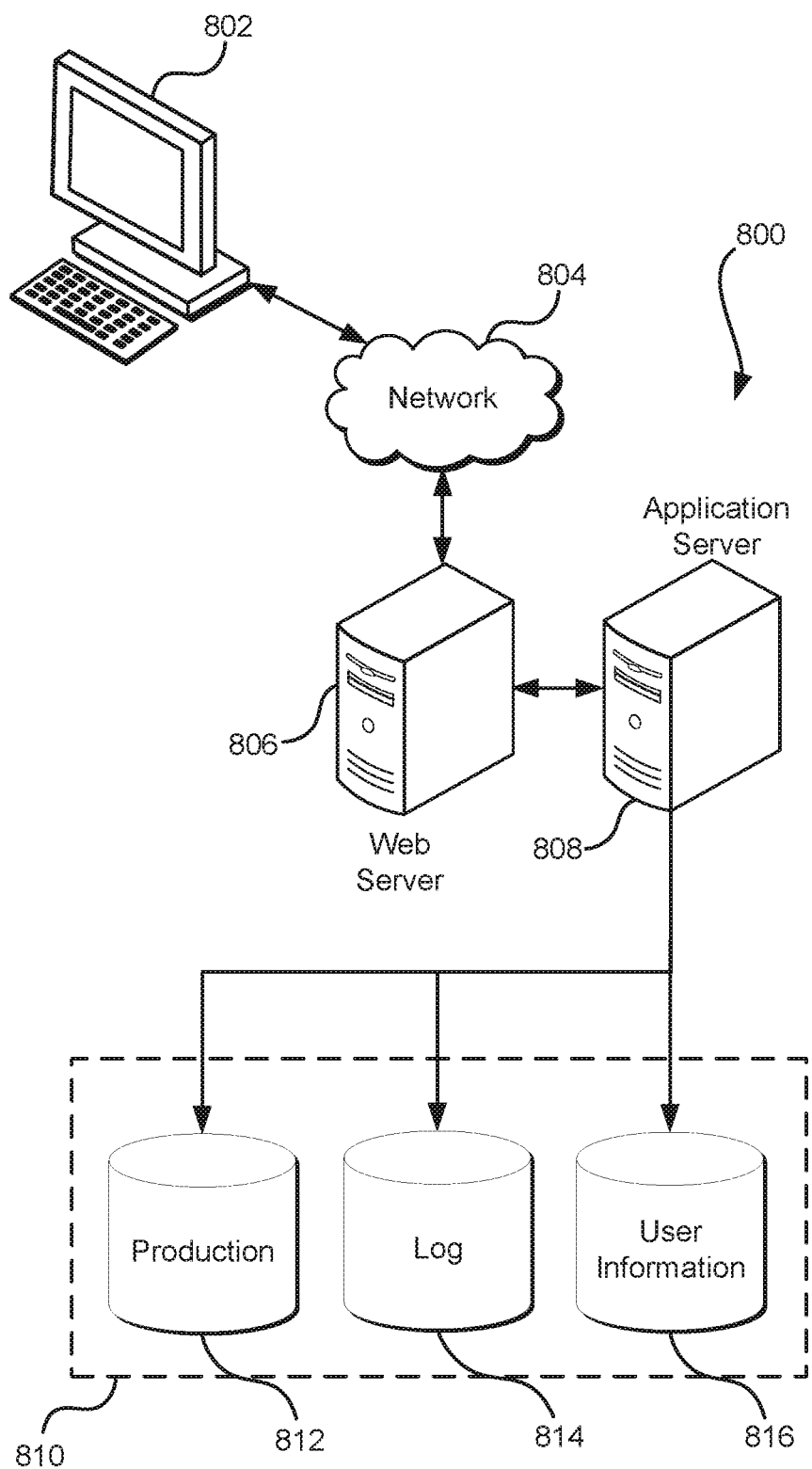
FIG. 8 shows an illustrative example of an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a customer computing device associated with a customer of a computing resource service provider, a first request to obtain data associated with one or more computing resources, the first request specifying identifiers for the one or more computing resources and a time range for the data;
   identifying one or more data log streams generated by the one or more computing resources that include the data, resulting in one or more identified data log streams;
   constructing, based at least in part on a number of the identified data log streams, a Bloom filter usable to determine whether any of the identified data log streams have been processed;
   adding the identified data log streams to the Bloom filter to generate an updated Bloom filter;

processing the identified data log streams until an allotted time period for processing of the first request has elapsed;

generating a continuation token that includes the Bloom filter, an ordering of a set of partially processed data log streams that were not completely processed during the allotted time period, and at least one time value, source information, and current byte information associated with at least one partially processed data log stream of the set of partially processed data log streams;

receiving a second request to obtain the data associated with the one or more computing resources, the second request including the continuation token;

obtaining an ordering of data log streams usable to fulfill the second request; and for a selected data log stream specified in the ordering of data log streams usable to fulfill the second request:

determining the selected data log stream is specified in the ordering of the set of partially processed data log streams;

utilizing the Bloom filter to determine the selected data log stream is included in the Bloom filter; and as a result of the selected data log stream not being specified in the ordering of the set of partially processed data log streams and not being included in the Bloom filter, adding the selected data log stream to the ordering of the set of partially processed data log streams to enable processing of the selected data log stream.

2. The computer-implemented method of claim 1, further comprising providing the continuation token and any data obtained from the identified data log streams to fulfill the first request.

3. The computer-implemented method of claim 1, further comprising, for at least one data log stream of the set of partially processed data log streams:

identifying a bit at which to resume processing of the at least one data log stream identified as partially processed based at least in part on the current byte information.

4. The computer-implemented method of claim 1, further comprising:

determining that an allotted time period for processing of the second request has elapsed;

updating the Bloom filter to include data log streams processed in response to the second request to generate a second updated Bloom filter;

updating the ordering of the set of partially processed data log streams in response to an addition of data log streams specified in the ordering of data log streams usable to fulfill the second request and processing of data log streams previously specified in the continuation token to generate an updated ordering of the set of partially processed data log streams; and generating a second continuation token that includes the second updated Bloom filter and the updated ordering of the set of partially processed data log streams.

5. A system, comprising at least one computing device configured to implement one or more services, wherein the one or more services:

generate a continuation token that includes a probabilistic data structure, an ordering of a set of partially processed data log streams which were not completely processed during an allotted time for a search query for data associated with one or more computing resources, a time value, source information, and information indicating a particular location within the set of partially processed data log streams to resume processing of the set of partially processed data log streams;

add information identifying members of the set of partially processed data log streams to the probabilistic data structure to enable the set of partially processed data log streams to be processed;

receive, from a computing device associated with a customer of a service of the one or more services, a request to resume the search query, the request including the continuation token specifying the set of partially processed data log streams which were processed prior to receiving the request;

obtain a set of data log streams to fulfill the request based at least in part on the set of partially processed data log streams indicated in the probabilistic data structure;

identify a first data log stream of the set of data log streams; and for the first data log stream fulfill the request by at least:

determining the first data log stream is specified in the continuation token as being a partially processed data log stream of the set of partially processed data log streams;

utilizing the probabilistic data structure to generate a determination that the first data log stream is not included in the probabilistic data structure; and as a result of the first data log stream not being specified in the continuation token as being a partially processed data log stream and the determination:

processing the first data log stream; and adding the first data log stream to the set of partially processed data log streams included in the probabilistic data structure.

6. The system of claim 5, wherein the one or more services further:

determine that a second data log stream of the set of data log streams has been processed in response to the request; and add the second data log stream to the probabilistic data structure to indicate that the second data log stream has been processed.

7. The system of claim 5, wherein the one or more services further:

determine that the allotted time for processing of the set of data log streams has passed; and generate a second continuation token that specifies at least one data log stream that was partially processed during the allotted time and an updated probabilistic data structure that includes a set of data log streams processed during the allotted time.

8. The system of claim 7, wherein the one or more services further transmit the second continuation token and data obtained as a result of processing the first data log stream in response to the request.

9. The system of claim 5, wherein the continuation token was generated in response to an initial request to obtain the data associated with the one or more computing resources, the continuation token generated by:

identifying a set of data log streams to process the initial request;

processing a subset of data log streams of the set of data log streams;

adding the subset of data log streams to the probabilistic data structure;

identifying the first data log stream as partially processed in response to the initial request; and encoding the first data log stream and the probabilistic data structure into the continuation token.

10. The system of claim 9, wherein the one or more services further:
  determine a first timestamp associated with the first data log stream;
  determine the time value associated with the first data log stream specified in the continuation token; and
  process the first data log stream according to an ordering of the first data log stream and the set of partially processed data log streams generated based at least in part on the first timestamp and the time value.

11. The system of claim 5, wherein the probabilistic data structure is a Bloom filter.

12. The system of claim 10, wherein as a result of the first data log stream being specified in the continuation token:
  identify a bit of the first data log stream at which to resume processing of the first data log stream based at least in part on current byte information included in the continuation token; and
  as a result of the first data log stream being processed completely, add the first data log stream to the probabilistic data structure.

13. A non-transitory computer-readable storage medium storing thereon executable instructions that, as a result of being executed by one or more processors of a computer system, cause the computer system to:
  identify, in response to a request to obtain data for one or more computing resources, a set of data log streams comprising data to fulfill the request;
  add information indicating the set of data log streams to a probabilistic data structure to allow the set of data log streams to be processed;
  process the set of data log streams during an interval of time;
  generate a token specifying a set of partially processed data log streams of the set of data log streams, a set of timestamps, a set of current byte fields, and the probabilistic data structure, the token used to resume processing of the request to obtain the data for the one or more computing resources after processing of the set of data log streams is terminated in response to an expiration on the interval of time;
  receive a second request to resume obtaining the data for the one or more computing resources, the second request including the token;
  obtain the set of partially processed data log streams in response to the second request; and
  for a first data log stream of the set of data log streams:
    utilize the token to generate a first determination that the first data log stream is not specified in the token as being a partially processed data log stream;
    obtain the probabilistic data structure from the token;
    utilize the probabilistic data structure to generate a second determination that the data log stream is not included in the probabilistic data structure;
    as a result of the first determination and the second determination, process the data log stream; and
    add the data log stream to the probabilistic data structure.

14. The non-transitory computer-readable storage medium of claim 13, wherein the instructions further cause the computer system to:
  identify, based at least in part on a false positive rate, a number of bits that can be assigned to individual data log streams of the set of data log streams to determine a size of the probabilistic data structure, resulting in a determined size; and
  generate the probabilistic data structure such that the probabilistic data structure has the determined size.

15. The non-transitory computer-readable storage medium of claim 13, wherein the instructions further cause the computer system to generate, in response to the second request, a second token specifying a first subset of data log streams of the set of data log streams usable to fulfill the second request that were partially processed and an updated probabilistic data structure that includes a second subset of data log streams of the set of data log streams processed in response to the request and the second request.

16. The non-transitory computer-readable storage medium of claim 13, wherein the instructions further cause the computer system to:
  determine that a data log stream of the set of data log streams has been processed in response to the second request; and
  update the probabilistic data structure to indicate that the data log stream has been processed.

17. The non-transitory computer-readable storage medium of claim 13, wherein the instructions further cause the computer system to:
  determine that the interval of time for processing of the request has elapsed;
  identify a subset of partially processed data log streams of the set of partially processed data log streams from the set of data log streams comprising data usable to fulfill the request;
  determine a bit at which to resume processing for a partially processed data log stream of the subset of partially processed data log streams and update the set of current byte fields based at least in part on the bit; and
  encode the subset of partially processed data log streams, the set of current byte fields, and the probabilistic data structure into the token.

18. The non-transitory computer-readable storage medium of claim 13, wherein the instructions further cause the computer system to provide the token and data obtained as a result of processing the set of data log streams to enable use of the token to submit an additional request to resume processing of the set of data log streams.

19. The non-transitory computer-readable storage medium of claim 13, wherein the instructions further cause the computer system to generate an ordering of the one or more data log streams based at least in part on timestamps of individual data log streams of the one or more data log streams.

20. The non-transitory computer-readable storage medium of claim 13, wherein the probabilistic data structure is a Bloom filter.

* * * * *